United States Patent
Van Nieuwenhuyze et al.

(10) Patent No.: US 10,223,628 B2
(45) Date of Patent: Mar. 5, 2019

(54) APPLICATION SELECTION IN A MOBILE TERMINAL

(71) Applicant: Proton World International N.V., Diegem (BE)

(72) Inventors: Olivier Van Nieuwenhuyze, Wezembeek-Oppem (BE); Frank Cuypers, De Pinte (BE); Patrick Dumoulin, Brussels (BE)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 158 days.

(21) Appl. No.: 15/258,818

(22) Filed: Sep. 7, 2016

(65) Prior Publication Data
US 2017/0255852 A1  Sep. 7, 2017

(30) Foreign Application Priority Data

Mar. 1, 2016 (FR) ..................................... 16 51711
Mar. 1, 2016 (FR) ..................................... 16 51712

(51) Int. Cl.
*G06Q 20/32* (2012.01)
*G06K 7/10* (2006.01)
*G06K 19/07* (2006.01)
*G06Q 20/34* (2012.01)
*H04B 5/00* (2006.01)

(52) U.S. Cl.
CPC ..... *G06K 19/0723* (2013.01); *G06K 7/10297* (2013.01); *G06Q 20/3278* (2013.01); *G06Q 20/352* (2013.01); *H04B 5/0031* (2013.01)

(58) Field of Classification Search
CPC ..................... G06K 7/10297; G06Q 20/3278
See application file for complete search history.

(56) References Cited

U.S. PATENT DOCUMENTS

2008/0129450 A1* 6/2008 Riegebauer .......... G06Q 20/341
                                                          340/5.86
2008/0306849 A1* 12/2008 Johnson, Jr. ............ G06F 21/35
                                                          705/35

(Continued)

FOREIGN PATENT DOCUMENTS

CN     104 392 192 A     3/2015
WO     2006/110000 A1    10/2006

(Continued)

OTHER PUBLICATIONS

"Identification cards—Contactless integrated circuit(s) cards—Proximity cards—Part 3: Initialization and anticollision," International Standard, ISO/IEC 14443-3, First Edition, Feb. 1, 2001, 58 pages.

(Continued)

*Primary Examiner* — Suezu Ellis
(74) *Attorney, Agent, or Firm* — Seed IP Law Group LLP

(57) ABSTRACT

A contactless communication circuit (card) communicates with a proximity coupling device (reader). The card hosts at least two applications. The card initializes an identifier of a communication protocol to a first value. In response to a failure of a transaction with the reader, the card increments a counter. When the counter reaches a threshold, the card changes the identifier to a second value.

22 Claims, 2 Drawing Sheets

(56) References Cited

U.S. PATENT DOCUMENTS

2010/0017881 A1* 1/2010 Goyet .................... G06F 21/34
              726/24
2014/0136329 A1* 5/2014 Chang ................ G06Q 30/0265
              705/14.62
2015/0324475 A1   11/2015 Kang et al.

FOREIGN PATENT DOCUMENTS

WO    2008/153996 A1   12/2008
WO    2012/080048 A1    6/2012

OTHER PUBLICATIONS

"Identification cards—Contactless integrated circuit(s) cards—Proximity cards—Part 4: Transmission protocol," International Standard, ISO/IEC 14443-4, First Edition, Feb. 1, 2001, 44 pages.

* cited by examiner

APPLICATION SELECTION IN A MOBILE TERMINAL

BACKGROUND

Technical Field

The present disclosure generally relates to electronic circuits and, more specifically, to contactless communication circuits. The present disclosure more specifically is directed to selection of a communication mode between a contactless communication terminal and a contactless communication circuit.

Description of the Related Art

The development of applications usable in contactless communications, between a proximity coupling device (PCD), for example, a contactless terminal (Contactless Reader), and a contactless integrated circuit (Proximity Integrated Circuit—PIC) or a contactless integrated circuit card (Proximity Integrated Circuit Card—PICC) generates new difficulties.

In particular, communications comply with evolving standards, which may raise problems of compatibility between different generations of devices or circuits.

Further, contactless integrated circuits, be they included in a microcircuit card, in a mobile phone, or in any other portable device, are more and more often capable of hosting a plurality of applications having different security levels. For example, a microcircuit card may host a bank application, for example, according to the EMV (Eurocard-MasterCard-Visa) standard, and other so-called proprietary applications, for example, access control, transport, and the like applications.

Such different applications may require different protocols. Usual systems are based on a detection, by the reader, of the capacity of the card to communicate according to one standard or another. However, this generates false rejections, that is, a card which would be capable of communicating with a reader is refused by said reader.

BRIEF SUMMARY

In an embodiment, the compatibility of a proximity integrated circuit for a communication with a proximity coupling device is verified.

An embodiment is compatible with existing coupling devices.

Thus, an embodiment provides a method of configuring a contactless communication circuit hosting at least two applications compatible with different communication protocols, comprising the steps of:

initializing an identifier of a communication protocol to a first value;

in case of failure of a transaction with a proximity coupling device, incrementing a counter; and when the counter value reaches a threshold, changing the value of the identifier to a second value.

According to an embodiment, the counter is reset for each successful transaction.

According to an embodiment, the identifier is reset to the first value for each transaction.

According to an embodiment, the value of the identifier conditions the communication protocol accepted by the circuit.

According to an embodiment, the circuit communicates according to the ISO 14443-4 protocol with the first identifier and according to the ISO 14443-3 protocol with the second identifier.

According to an embodiment, a first application is an EMV application.

According to an embodiment, a second application is a MIFARE Classic or MIFARE Classic+ application.

According to an embodiment, the threshold has a value between 2 and 10.

An embodiment provides a contactless communication circuit comprising a microprocessor programmed to implement the above method.

An embodiment provides a microcircuit card comprising such a circuit.

In an embodiment, a method comprises: initializing, in a contactless communication circuit hosting at least two applications having different communication protocols, an identifier of a communication protocol to a first value; in response to a failure of a transaction between the contactless communication circuit and a proximity coupling device, incrementing a counter value in the contactless communication circuit; and when the counter value reaches a threshold, changing the value of the identifier to a second value. In an embodiment, the method comprises: responding to each successful transaction by resetting the counter. In an embodiment, the method comprises: resetting the identifier to the first value for a next transaction. In an embodiment, the value of the identifier indicates a communication protocol accepted by the contactless communication circuit. In an embodiment, the first identifier indicates an ISO 14443-4 protocol and the second identifier indicates an ISO 14443-3 protocol. In an embodiment, a first application is a Eurocard-MasterCard-Visa (EMV) application. In an embodiment, a second application is one of a MIFARE Classic and a MIFARE Classic+ application. In an embodiment, the threshold has a value in a range from 2 to 10.

In an embodiment, a device comprises: one or more memories; and contactless communication circuitry coupled to the one or more memories, wherein the contactless communication circuitry, in operation: initializes an identifier of a communication protocol to a first value corresponding to a first hosted application; increments a counter value in response to a failure of a transaction between the contactless communication circuitry and a proximity coupling device; and changes the value of the identifier to a second value corresponding to a second hosted application in response to the counter value reaching a threshold. In an embodiment, the contactless communication circuitry, in operation, resets the counter in response to a successful transaction. In an embodiment, the contactless communication circuitry, in operation, resets the identifier to the first value for a next transaction. In an embodiment, the value of the identifier indicates a communication protocol accepted by the contactless communication circuit. In an embodiment, the first identifier indicates an ISO 14443-4 protocol and the second identifier indicates an ISO 14443-3 protocol. In an embodiment, the first application is a Eurocard-MasterCard-Visa (EMV) application. In an embodiment, the second application is one of a MIFARE Classic and a MIFARE Classic+ application. In an embodiment, the threshold has a value in a range from 2 to 10. In an embodiment, the device comprises: a microcircuit card including the one or more memories and the contactless communication circuitry. In an embodiment, the device comprises: mobile telecommunication circuitry.

In an embodiment, a system comprises: one or more circuits; and contactless communication circuitry coupled to the one or more circuits, wherein the contactless communication circuitry, in operation: initializes an identifier of a communication protocol to a first value corresponding to a first application hosted by the contactless communication circuitry; increments a counter value in response to a failure of a transaction between the contactless communication circuitry and a proximity coupling device; and changes the value of the identifier to a second value corresponding to a second application hosted by the contactless communication circuitry in response to the counter value reaching a threshold. In an embodiment, the contactless communication circuitry, in operation, resets the counter in response to a successful transaction. In an embodiment, the system comprises: the proximity coupling device. In an embodiment, the contactless communication circuitry comprises a near-field communication (NFC) router operating in card mode.

The foregoing and other features and advantages of various embodiments will be discussed in detail in the following non-limiting description of specific embodiments in connection with the accompanying drawings.

DETAILED DESCRIPTION

Figure 1:
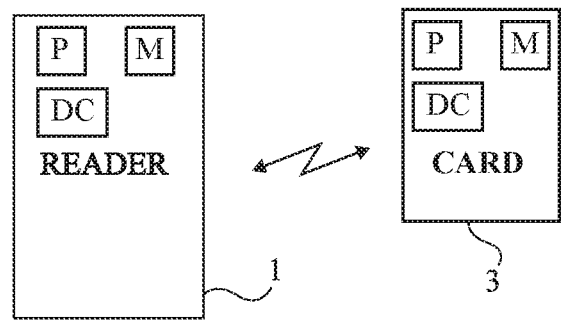
FIG. 1 very schematically shows an embodiment of a proximity communication device.

The same elements have been designated with the same reference numerals in the different drawings, unless the context indicates otherwise.

For clarity, only those steps and elements which are useful to the understanding of the embodiments which will be described have been shown and will be detailed. In particular, the exchanges between the proximity coupling device and a proximity integrated circuit once the communication has been completed have not been detailed, the described embodiments being compatible with usual exchanges.

The embodiments are described while taking as an example a contactless card forming a proximity integrated circuit card (PICC) and a contactless reader forming a proximity coupling device (PCD). Embodiments, however, may more generally apply to any device used as a proximity coupling device and to any contactless communication integrated circuit where similar problems are posed. Further, although reference is made to payment applications, the described embodiments transpose to applications of different nature, for example, when such applications generate similar problems and such applications are compatible with the described embodiments.

FIG. 1 very schematically shows an example of a contactless communication system of the type to which the described embodiments may apply.

A contactless communication terminal 1 or proximity reader (READER) generates an electromagnetic field. A proximity card 3 (CARD) located within the range of the reader detects the field and is capable of exchanging information with the reader.

Contactless communication protocols may be "proprietary", that is, set by the manufacturer, or standardized. In particular, bank cards may use a so-called EMV technology which uses protocols based on the ISO 14443-4 standard. Multi-application cards are however capable of hosting not only a bank application according to the EMV technology, but also applications which use other technologies, such as a technology known as MIFARE. The MIFARE technology uses, in certain implementations, an (application) communication protocol which does not support the ISO 14443-4 protocol. The application to be launched by the card depends on the reader with which it communicates. Indeed, a reader is generally dedicated to an application (for example, bank, transport, access control, etc.) and the activation of a card in the field of the reader depends on the protocol accepted by the card.

As illustrated in FIG. 1, the reader 1 may comprise circuitry, such as one or more processors P, one or more memories M and discrete circuitry DC, which may be used alone or in various combinations to implement the functionality of the reader 1. Similarly, as illustrated in FIG. 1, the card 3 may comprise circuitry, such as one or more processors P, one or more memories M and discrete circuitry DC, which may be used alone or in various combinations to implement the functionality of the card 3.

Figure 2:
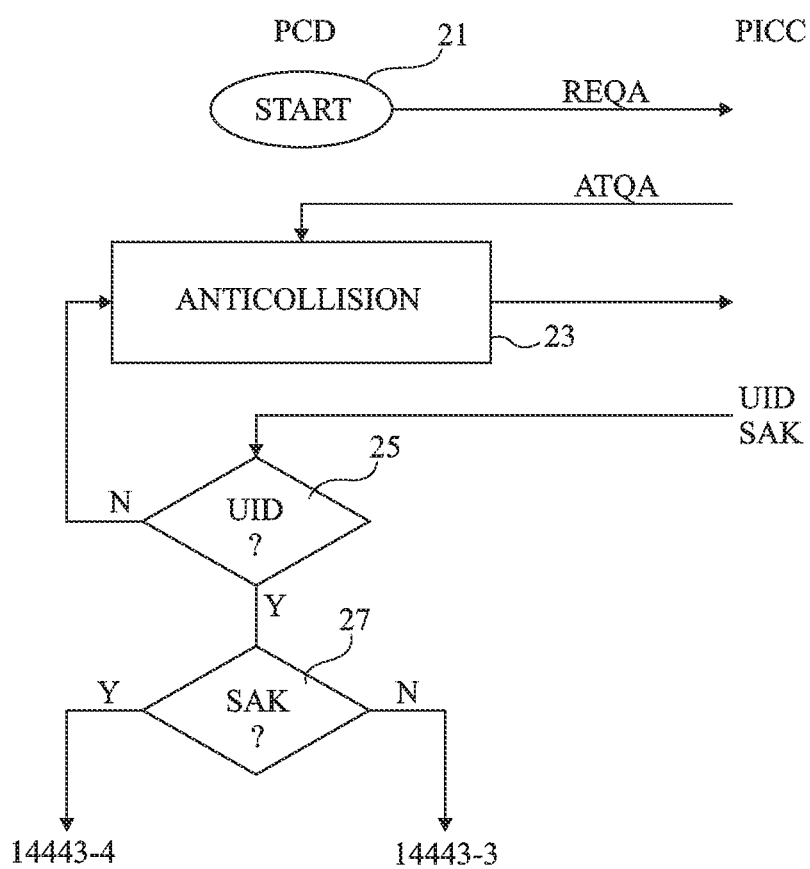
FIG. 2 is a simplified block diagram of an example configuration of a proximity coupling device.

FIG. 2 is a block diagram illustrating steps of an example sequence of activation of a card in the field of a reader.

The PCD reader emits, periodically or when it detects (block 21, START) the presence of a load in the field that it generates, a request (REQA) intended for the cards possibly present in the field. If a PICC card present in the field interprets request REQA, it sends an acknowledgement message ATQA. On reception of such a message, the reader starts a so-called anticollision procedure (block 23, ANTI-COLLISION) to make sure that it communicates with a single card. Such a procedure includes the sending, by the card, of an identifier UID of the card and of a SAK (Select AcKnowledge) code identifying the application hosted by the card and with which it answers. The reader verifies whether identifier UID is complete (block 25, UID?). If it is not (output N of block 25), the anticollision procedure carries on until a complete identifier is received. If it is (output Y of block 25), the reader reads the SAK code to determine the protocol of communication with the card. Typically, the PCD reader may determine (block 27, SAK?) whether the card is compatible (output Y of block 27) with the 14443-4 or (output N of block 27) with the 14443-3 protocol.

The SAK code or SAK value determines the communication protocol accepted by the card.

The use of multi-application cards, for example, hosting both an EMV-type bank application and an application of MIFARE Plus type may generate difficulties.

The MIFARE technology has different security levels SL0 to SL3 according to the card generation. More particularly, a MIFARE Classic (SL1 mode) or MIFARE Classic+ (SL2 mode) card is compatible with the ISO 14443-3 protocol. A MIFARE Plus (SL3) card is compatible with the ISO 14443-4 protocol. Further, advanced MIFARE Plus cards are downwardly compatible. Thus, a MIFARE Plus card may also operate under lower security levels, to be compatible with existing readers. Similarly, a reader hosting MIFARE Plus applications is generally capable of operating according to lower protocols (MIFARE Classic or Classic+).

To benefit from the advantages of the most recent protocols and particularly of the MIFARE Plus protocol, a reader hosting a MIFARE Plus application first attempts to establish a communication according to this protocol. Thus, in the presence of a card in its field, it attempts to establish a communication according to the ISO 14443-4 protocol. If the card answers, this means that it is compatible with the MIFARE Plus technology and the communication starts. If the card does not answer, the reader switches to a lower-level MIFARE Classic protocol and communicates according to the 14443-3 standard.

However, in the presence of a card hosting an EMV application and a MIFARE Classic application, the communication cannot be established, even though the card is compatible with the reader. Indeed, when the communication is established, the card answers that it accepts the 14443-4 protocol since it hosts an EMV application. The reader then starts the communication in MIFARE Plus mode. However, the card does not respond since its MIFARE application is not compatible with the MIFARE Plus technology. One then is in a situation where a card which could have communicated with the reader in MIFARE Classic (or Classic+) mode is prevented from communicating since it hosts an EMV application.

In practice, a card does not recognize the nature of the transaction (for example, EMV or MIFARE Plus) before the card receives specific control signals linked to the application. Now, a MIFARE Plus reader starts by adapting the transaction to the highest-performance protocol (MIFARE Plus) before sending specific control signals to the application. This results, for cards hosting an EMV application and a MIFARE application but which are not compatible with MIFARE Plus, in a failure of the transaction even though the reader and the card are compatible with the MIFARE Classic technology.

Figure 3:
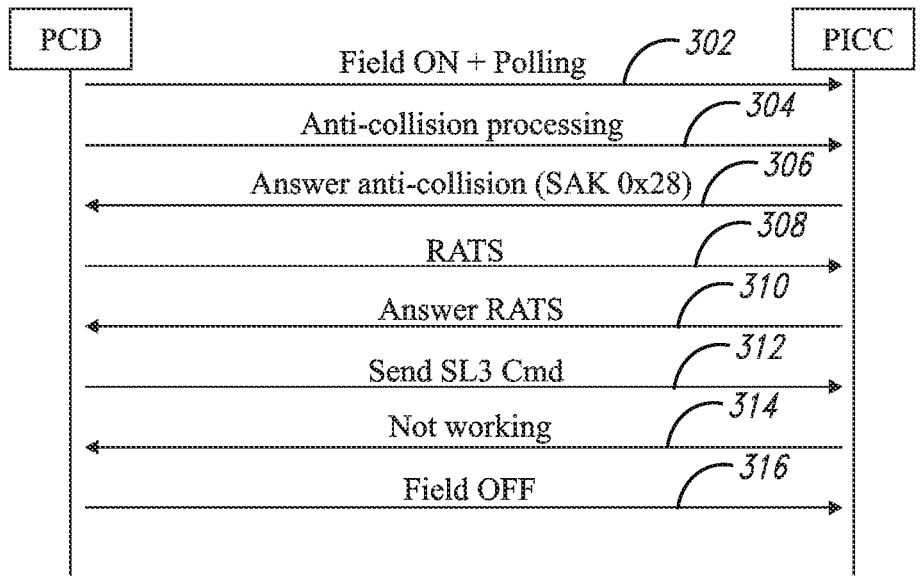
FIG. 3 illustrates the establishing of a proximity communication according to a MIFARE Plus protocol.

FIG. 3 very schematically illustrates an example of the rejection of a transaction by a MIFARE Plus reader in such a situation.

At 302, the reader (PCD) turns on (FIELD ON) the field (activates the field generation) and periodically sends (Polling) a request (REQA, FIG. 2). At 304, the card (PICC) answers and an anticollision process starts. Since the card is an EMV card, at 306 the card answers (Answer anticollision) with a SAK value compatible with the ISO 14443-4 standard. For an EMV and MIFARE Classic card, the SAK value is 0×28. On reception of the answer, the reader at 308 sends a standardized request of the ISO 14443-4 standard called RATS (Request for Answer to Select) enabling to switch to the MIFARE Plus mode if the card answers or to remain in MIFARE Classic mode in the opposite case. Since the card hosts an EMV application, at 310 the card answers (Answer RATS) this request of the 14443-4 standard. The reader then starts at 312 a MIFARE Plus transaction with security level SL3 (Send SL3 Cmd). However, the card remains mute at 314 (Not working) or returns an error (for example, by mentioning an unknown control signal) since the card's MIFARE application is not compatible with this security level. The reader then turns off the field (Field OFF) at 316.

While usual techniques are based on a detection by the reader, the inventors have realized that performing a detection on the card side may facilitate addressing the above-discussed situation and to enable a level-SL1 or -SL2 MIFARE card to communicate with a MIFARE Plus reader despite the fact that the card hosts an EMV application.

Figure 4:
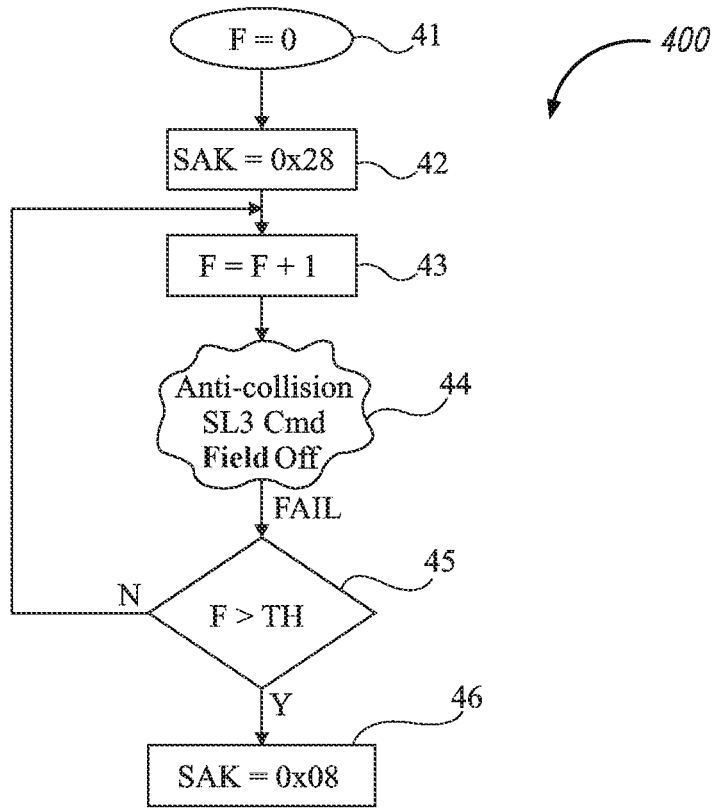
FIG. 4 is a simplified block diagram of an embodiment of a method of configuring a proximity coupling device.

FIG. 4 very schematically illustrates an embodiment of a method 400 of detection of a request by a card to establish a MIFARE transaction.

According to this embodiment, the card counts the number of failed transactions under the ISO 14443-4 protocol and, beyond a threshold, modifies its SAK value for a value compatible with the ISO 14443-3 standard. Thus, this causes a switching from a MIFARE Plus reader to a MIFARE Classic mode.

When the card is in the field of a reader communicating according to the 14443-4 protocol, the card initializes a counter (block 41, F=0) of the number of transaction failures as well as the card's SAK value to the value corresponding to the applications that the card hosts and to the card's MIFARE security level. For example, when the card is an EMV and MIFARE Classic card, the card initializes the SAK value to 0×28 (block 42, SAK 0×28). A transaction with the reader starts. The card increments counter F (block 43, F=F+1). In the presence of a MIFARE Plus reader, the latter executes (block 44, Anti Collision, SL3 Cmd, Field Off) the steps illustrated in FIG. 3. The transaction fails (FAIL). The card then compares the counter value with a threshold TH (block 45, F>TH?). As long as this threshold has not been reached (output N of block 45), the card keeps its SAK value and a new transaction will be attempted by the reader. After a number of failed transactions corresponding to threshold TH (output Y of block 45), the card modifies the card's SAK value (block 46, SAK=0×08) so that the SAK value corresponds to that of a single-application MIFARE Classic card. Thus, at the next transaction, the card communicates this value to the reader which does not switch to the 14443-4 mode but remains in 14443-3 mode and the transaction can be performed.

It should be noted that the above-described operation of an embodiment does not adversely affect the card operation with other readers. Indeed, if the card faces an EMV payment terminal, the reader sends an EMV control signal by using the 14443-4 protocol and the card answers. If the card faces a MIFARE Classic terminal, the latter emits according to the 14443-3 protocol and the selection of the MIFARE application on the card side poses no problem.

Further, the use of a counter of failed transactions has the advantage of avoiding a switching to a lower mode in case of an incidental failure of a transaction (disturbance of the communication, for example). The threshold value is at least 2 and, in an embodiment, at most 10, for example, 3 or 4.

Counter F may be a counter in non-volatile memory so that its value can be kept between two transactions. The counter may however be reset, for example, when a transaction is successful.

Further, the SAK value of the card may be reset to the original SAK value or a native value (multi-applications) either after a given time, or when a transaction is successful, or at the first one of these two events. The SAK value of a card may be stored in a non-volatile memory. The implementation of the above embodiment may use a second field to store the SAK value of the transaction. For example, the SAK transaction value is stored in a volatile memory register. Thus, this register is automatically reset for each transaction and has the native value transferred into the register at the beginning of each transaction.

The native SAK value of the card (block 42) and the value to which the SAK value switches (block 46) may depend on its MIFARE security level and on the card type (in particular on the size of the card's memory). Thus, an EMV and MIFARE Classic card takes SAK values 0×28 and 0×08 for a 2K card (2 kilo-bytes) and values 0×38 and 0×18 for a 4K card. An EMV and MIFARE Classic+ card takes values SAK 0×30 and 0×10 for a 2K card and values 0×31 and 0×11 for a 4K card.

The above-described embodiment is implemented on the card side and is transparent for the reader (it requires no modification on the reader side). The cards thus formed (programmed) are thus compatible with existing readers.

Various embodiments have been described. Various alterations and modifications will occur to those skilled in the art. In particular, although the embodiments have been described in relation with a microcircuit card, they are compatible with an implementation in any proximity communication device where similar problems are posed, for example, a cell phone equipped with a NFC router operating in card mode. Further, although the embodiments have been more specifically described in relation with an example of application to MIFARE and EMV bank transactions, they transpose to other applications where similar problems are posed. Further, the practical implementation of the described embodiments is within the abilities of those skilled in the art based on the functional indications given hereabove and by using or by programming circuits usual per se. In particular, a contactless integrated communication circuit to which these embodiments apply generally comprises at least one microprocessor, one or a plurality of volatile and non-volatile memory units, a proximity communication interface and, often, other circuits according to the hosted applications.

Such alterations, modifications, and improvements are intended to be part of this disclosure, and are intended to be within the spirit and the scope of the present disclosure. Accordingly, the foregoing description is by way of example only and is not intended to be limiting.

Some embodiments of the method 400 may perform other acts not shown in FIG. 4, may not perform all of the acts shown in FIG. 4, or may perform the acts of FIG. 4 in a different order.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
    initializing, in a contactless communication circuit hosting at least two applications having different communication protocols, an identifier of a communication protocol to a first value corresponding to a first hosted application;
    in response to a failure of a transaction between the contactless communication circuit and a proximity coupling device, incrementing a counter value in the contactless communication circuit; and
    when the counter value reaches a threshold, changing the value of the identifier to a second value corresponding to a second hosted application.

2. The method of claim 1, comprising:
    responding to each successful transaction by resetting a counter storing the counter value.

3. The method of claim 1, comprising:
    resetting the identifier to the first value for a next transaction.

4. The method of claim 1 wherein the value of the identifier indicates a communication protocol accepted by the contactless communication circuit.

5. The method of claim 4 wherein the first value of the identifier indicates an ISO 14443-4 protocol and the second value of the identifier indicates an ISO 14443-3 protocol.

6. The method of claim 1 wherein a first application is a Eurocard-MasterCard-Visa (EMV) application.

7. The method of claim 6 wherein a second application is one of a MIFARE Classic and a MIFARE Classic+ application.

8. The method of claim 1 wherein the threshold has a value in a range from 2 to 10.

9. A device, comprising:
    one or more memories; and
    contactless communication circuitry coupled to the one or more memories, wherein the contactless communication circuitry, in operation:
        initializes an identifier of a communication protocol to a first value corresponding to a first hosted application;
        increments a counter value in response to a failure of a transaction between the contactless communication circuitry and a proximity coupling device; and
        changes the value of the identifier to a second value corresponding to a second hosted application in response to the counter value reaching a threshold.

10. The device of claim 9 wherein the contactless communication circuitry, in operation, resets a counter storing the counter value in response to a successful transaction.

11. The device of claim 9 wherein the contactless communication circuitry, in operation, resets the identifier to the first value for a next transaction.

12. The device of claim 9 wherein the value of the identifier indicates a communication protocol accepted by the contactless communication circuit.

13. The device of claim 12 wherein the first value of the identifier indicates an ISO 14443-4 protocol and the second value of the identifier indicates an ISO 14443-3 protocol.

14. The device of claim 9 wherein the first application is a Eurocard-MasterCard-Visa (EMV) application.

15. The device of claim 14 wherein the second application is one of a MIFARE Classic and a MIFARE Classic+ application.

16. The device of claim 9 wherein the threshold has a value in a range from 2 to 10.

17. The device of claim 9, comprising:
a microcircuit card including the one or more memories and the contactless communication circuitry.

18. The device of claim 9, comprising:
mobile telecommunication circuitry.

19. A system, comprising:
one or more circuits; and
contactless communication circuitry coupled to the one or more circuits, wherein the contactless communication circuitry, in operation:
   initializes an identifier of a communication protocol to a first value corresponding to a first application hosted by the contactless communication circuitry;
   increments a counter value in response to a failure of a transaction between the contactless communication circuitry and a proximity coupling device; and
   changes the value of the identifier to a second value corresponding to a second application hosted by the contactless communication circuitry in response to the counter value reaching a threshold.

20. The system of claim 19 wherein the contactless communication circuitry, in operation, resets a counter storing the counter value in response to a successful transaction.

21. The system of claim 19, comprising:
the proximity coupling device.

22. The system of claim 19 wherein the contactless communication circuitry comprises a near-field communication (NFC) router operating in card mode.

\* \* \* \* \*